United States Patent
Reza et al.

(10) Patent No.: US 9,935,676 B2
(45) Date of Patent: Apr. 3, 2018

(54) OPPORTUNISTIC ANTENNA SWITCH DIVERSITY (ASDIV) IN CARRIER AGGREGATION

(71) Applicant: QUALCOMM Incorporated, San Diego, CA (US)

(72) Inventors: Ashrafur Reza, San Diego, CA (US);
Peyman Hesami, San Diego, CA (US);
Ning He, Sammamish, WA (US);
Robert King Chan, La Jolla, CA (US);
Sagar Kakade, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 14/858,791

(22) Filed: Sep. 18, 2015

(65) Prior Publication Data

US 2017/0054470 A1  Feb. 23, 2017

Related U.S. Application Data

(60) Provisional application No. 62/208,505, filed on Aug. 21, 2015.

(51) Int. Cl.
| | |
|---|---|
| *H04W 24/00* | (2009.01) |
| *H04B 1/44* | (2006.01) |
| *H04B 7/08* | (2006.01) |
| *H04L 5/00* | (2006.01) |
| *H04B 7/0404* | (2017.01) |
| *H04L 12/26* | (2006.01) |
| *H04W 24/02* | (2009.01) |
| *H04W 24/10* | (2009.01) |

(52) U.S. Cl.
CPC ............. *H04B 1/44* (2013.01); *H04B 7/0404* (2013.01); *H04B 7/0802* (2013.01); *H04L 5/001* (2013.01); *H04L 5/006* (2013.01); *H04L 5/0048* (2013.01); *H04L 43/16* (2013.01); *H04W 24/02* (2013.01); *H04W 24/10* (2013.01)

(58) Field of Classification Search
CPC ...... H04B 7/08; H04B 7/0802; H04B 7/0814; H04B 7/0817; H04B 7/0822
See application file for complete search history.

(56) References Cited

U.S. PATENT DOCUMENTS

| | | | |
|---|---|---|---|
| 2006/0034279 A1* | 2/2006 | Cho | H04B 7/0617 370/390 |
| 2011/0249576 A1* | 10/2011 | Chrisikos | H01Q 1/243 370/252 |
| 2011/0250926 A1 | 10/2011 | Wietfeldt et al. | |
| 2012/0002630 A1 | 1/2012 | Bergman et al. | |

(Continued)

FOREIGN PATENT DOCUMENTS

GB  2472978 A  3/2011

OTHER PUBLICATIONS

Partial International Search Report—PCT/US2016/041173—ISA/EPO—dated Oct. 6, 2016.

(Continued)

*Primary Examiner* — Ping Hsieh
(74) *Attorney, Agent, or Firm* — Patterson & Sheridan, L.L.P

(57) ABSTRACT

Aspects of the present disclosure relate to techniques for switching antennas in devices that have multiple antennas for communicating via aggregation of multiple carriers.

27 Claims, 13 Drawing Sheets

(56) References Cited

U.S. PATENT DOCUMENTS

| | | |
|---|---|---|
| 2013/0051284 A1 | 2/2013 | Khlat |
| 2014/0003300 A1 | 1/2014 | Weissman et al. |
| 2014/0341125 A1* | 11/2014 | Dayal ............... H04B 1/44 370/329 |
| 2015/0065152 A1 | 3/2015 | Sadek et al. |
| 2015/0094003 A1 | 4/2015 | Ramkumar et al. |
| 2015/0139092 A1* | 5/2015 | Guo ............... H04L 5/001 370/329 |
| 2015/0189516 A1 | 7/2015 | Seo et al. |
| 2015/0230206 A1* | 8/2015 | Tabet ............... H04W 72/02 370/329 |
| 2015/0304000 A1* | 10/2015 | Wloczysiak ............ H04B 1/006 455/78 |
| 2016/0036508 A1* | 2/2016 | Szini ............... H04B 7/0814 375/227 |
| 2016/0173172 A1* | 6/2016 | Greene ............... H04B 7/0404 455/562.1 |

OTHER PUBLICATIONS

International Search Report and Written Opinion—PCT/US2016/041173—ISA/EPO—dated Jan. 18, 2017.

* cited by examiner

Type I Antenna Switching

Type II Antenna Switching

OPPORTUNISTIC ANTENNA SWITCH DIVERSITY (ASDIV) IN CARRIER AGGREGATION

CLAIM OF PRIORITY UNDER 35 U.S.C. § 119

The present Application for Patent claims benefit of U.S. Provisional Patent Application Ser. No. 62/208,505, filed Aug. 21, 2015 and assigned to the assignee hereof and hereby expressly incorporated by reference herein.

FIELD

Certain embodiments of the present disclosure generally relate to wireless communication and, more particularly, to techniques for switching antennas in devices that have multiple antennas for communicating via aggregation of multiple carriers.

BACKGROUND

Wireless communication systems are widely deployed to provide various types of communication content such as voice, data, and so on. These systems may be multiple-access systems capable of supporting communication with multiple users by sharing the available system resources (e.g., bandwidth and transmit power). Examples of such multiple-access systems include code division multiple access (CDMA) systems, time division multiple access (TDMA) systems, frequency division multiple access (FDMA) systems, 3GPP Long Term Evolution (LTE) systems, and orthogonal frequency division multiple access (OFDMA) systems.

Generally, a wireless multiple-access communication system can simultaneously support communication for multiple wireless terminals. Each terminal (also referred to as a user equipment or "UE") communicates with one or more base stations via transmissions on the forward and reverse links. The forward link (or downlink) refers to the communication link from the base stations to the terminals, and the reverse link (or uplink) refers to the communication link from the terminals to the base stations. This communication link may be established via a single-in-single-out, multiple-in-signal-out or a multiple-in-multiple-out (MIMO) system.

Some systems may utilize carrier aggregation, whereby multiple carriers are used to increase available bandwidth resources. Each aggregated carrier is referred to as a component carrier, CC. Often a primary component carrier (PCC) is used for various communications (e.g., control and user data in a primary cell or "$P_{CELL}$"), while other secondary component carriers (SCCs) are limited to certain types of communication (e.g., only user data in a secondary cell or "$S_{CELL}$").

In devices utilizing multiple antennas, algorithms exist for switching between antennas in an effort to achieve optimum performance (e.g., to switch from using a certain antenna that is blocked by how the device is being held). The switching may be based on reference signal receive power (RSRP) measurements obtained on the different antennas.

Unfortunately, such switching algorithms have been designed mainly for single-cell (single component carrier) scenarios, which presents drawbacks in carrier aggregation scenarios. For example, a UE with more than one serving cell (a $P_{CELL}$ and at least one $S_{CELL}$) may use a switching algorithm that triggers a switch solely based on measurements made on a $P_{CELL}$ even to switch the antennas for the $S_{CELL}$. Thus, the $S_{CELL}$ blindly follows the switching decision made for the $P_{CELL}$.

SUMMARY

Aspects of the present disclosure relate to techniques for switching antennas in devices that have multiple antennas for communicating via aggregation of multiple carriers.

Aspects of the present disclosure provide a method for switching antennas in a user equipment capable of carrier aggregation (CA). The method generally includes communicating via a primary component carrier using a first set of antennas, communicating via a secondary component carrier using a second set of antennas, controlling a first switching circuit used to route signals from at least one of the first set of antennas for receive diversity based on first criteria, and controlling a second switching circuit used to route signals from at least one of the second set of antennas for receive diversity based on second criteria, different from the first criteria.

Aspects of the present disclosure provide a method for switching antennas in a user equipment capable of carrier aggregation (CA). The method generally includes communicating via a primary component carrier using at least a first antenna, communicating via a secondary component carrier using at least a second antenna, and controlling a switching circuit used to route signals from the first and second antennas based on criteria involving measurements for both the primary component carrier and the secondary component carrier.

Aspects of the present disclosure provide an apparatus for switching antennas in a user equipment capable of carrier aggregation, comprising at least one processor and a memory coupled with the at least one processor having instructions stored thereon. The instructions are generally executable by the at least one processor for communicating via a primary component carrier using a first set of antennas, communicating via a secondary component carrier using a second set of antennas, controlling a first switching circuit used to route signals from at least one of the first set of antennas for receive diversity based on first criteria, and controlling a second switching circuit used to route signals from at least one of the second set of antennas for receive diversity based on second criteria, different from the first criteria.

Aspects of the present disclosure provide an apparatus for switching antennas in a user equipment capable of carrier aggregation, comprising at least one processor and a memory coupled with the at least one processor having instructions stored thereon. The instructions are generally executable by the at least one processor for communicating via a primary component carrier using at least a first antenna, communicating via a secondary component carrier using at least a second antenna, and controlling a switching circuit used to route signals from the first and second antennas based on criteria involving measurements for both the primary component carrier and the secondary component carrier.

Certain aspects of the present disclosure provide various apparatuses and program products for performing the operations of the methods described above.

BRIEF DESCRIPTION OF THE DRAWINGS

The features, nature, and advantages of the present disclosure will become more apparent from the detailed description set forth below when taken in conjunction with the drawings in which like reference characters identify correspondingly throughout and wherein.

DETAILED DESCRIPTION

Figure 1:
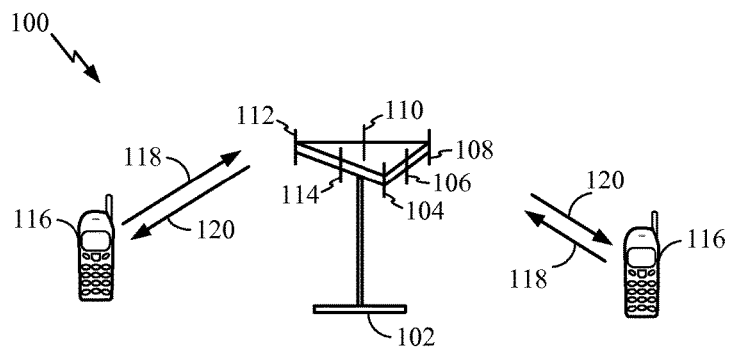
FIG. 1 illustrates a multiple access wireless communication system, according to aspects of the present disclosure.

User equipments (UEs) may be capable of performing wireless communication by aggregating together time division duplexing (TDD) component carriers and frequency division duplexing (FDD) component carriers (CCs), called carrier aggregation (CA). As noted above, CA presents challenges to antenna switching algorithms.

Aspects of the present disclosure provide techniques for antenna switching for carrier aggregation (CA) UEs, for example, based on independent switch criteria and switch decisions for each serving cell ($P_{CELL}$ and $S_{CELL}$). The techniques presented herein may be applied in a variety of different antenna and switch configurations, for example, regardless of whether $P_{CELL}$ and $S_{CELL}$ (primary and diversity) antennas are controlled by a same switch or separate switches.

The detailed description set forth below, in connection with the appended drawings, is intended as a description of various configurations and is not intended to represent the only configurations in which the concepts described herein may be practiced. The detailed description includes specific details for the purpose of providing a thorough understanding of the various concepts. However, it will be apparent to those skilled in the art that these concepts may be practiced without these specific details. In some instances, well-known structures and components are shown in block diagram form in order to avoid obscuring such concepts.

The techniques described herein may be used for various wireless communication networks such as Code Division Multiple Access (CDMA) networks, Time Division Multiple Access (TDMA) networks, Frequency Division Multiple Access (FDMA) networks, Orthogonal FDMA (OFDMA) networks, Single-Carrier FDMA (SC-FDMA) networks, etc. The terms "networks" and "systems" are often used interchangeably. A CDMA network may implement a radio technology such as Universal Terrestrial Radio Access (UTRA), cdma2000, etc. UTRA includes Wideband-CDMA (W-CDMA) and Low Chip Rate (LCR). cdma2000 covers IS-2000, IS-95 and IS-856 standards. A TDMA network may implement a radio technology such as Global System for Mobile Communications (GSM). An OFDMA network may implement a radio technology such as Evolved UTRA (E-UTRA), Institute of Electrical and Electronics Engineers (IEEE) 802.11, IEEE 802.16, IEEE 802.20, Flash-OFDM®, etc. UTRA, E-UTRA, and GSM are part of Universal Mobile Telecommunication System (UMTS). Long Term Evolution (LTE) is an upcoming release of UMTS that uses E-UTRA. UTRA, E-UTRA, GSM, UMTS and LTE are described in documents from an organization named "3rd Generation Partnership Project" (3GPP). cdma2000 is described in documents from an organization named "3rd Generation Partnership Project 2" (3GPP2). These various radio technologies and standards are known in the art. For clarity, certain aspects of the techniques are described below for LTE, and LTE terminology is used in much of the description below.

Single carrier frequency division multiple access (SC-FDMA), which utilizes single carrier modulation and frequency domain equalization, is a wireless transmission technique. SC-FDMA has similar performance and essentially the same overall complexity as those of an OFDMA system. SC-FDMA signal has lower peak-to-average power ratio (PAPR) because of its inherent single carrier structure. SC-FDMA has drawn great attention, especially in uplink communications where lower PAPR greatly benefits the mobile terminal in terms of transmit power efficiency. It is currently a working assumption for the uplink multiple access scheme in 3GPP Long Term Evolution (LTE), or Evolved UTRA.

Example Wireless Network

FIG. 1 shows a wireless communication network 100 (e.g., an LTE network), in which aspects of the present disclosure may be performed. For example, UEs 116 may utilize the techniques described herein for antenna switching.

Referring to FIG. 1, a multiple access wireless communication system according to one embodiment is illustrated. A base station (BS) 102 includes multiple antenna groups, one including 104 and 106, another including 108 and 110, and an additional including 112 and 114. In FIG. 1, only two antennas are shown for each antenna group, however, more or fewer antennas may be utilized for each antenna group. UEs 116 are in communication with antennas 112 and 114, where antennas 112 and 114 transmit information to UE 116 over forward link 120 and receive information from UE 116 over reverse link 118. In a frequency division duplexing (FDD) system, communication links 118 and 120 may use different frequency for communication. For example, forward link 120 may use a different frequency then that used by reverse link 118.

Each group of antennas and/or the area in which they are designed to communicate is often referred to as a sector of the points 102. In the embodiment, antenna groups each are designed to communicate to UEs in a sector of the areas covered by BS 102.

In communication over forward links 120 and 126, the transmitting antennas of BS 102 may utilize beamforming in order to improve the signal-to-noise ratio of forward links for the different UEs 116. Also, a BS using beamforming to transmit to UEs scattered randomly through its coverage causes less interference to UEs in neighboring cells than a BS transmitting through a single antenna to all its UEs.

A BS may be a fixed station used for communicating with the terminals and may also be referred to as an access point, a Node B, or some other terminology. A UE may also be called a user terminal, an access terminal, a wireless communication device, terminal, or some other terminology.

Wireless communication network 100 may support operation on multiple carriers, which may be referred to as carrier aggregation (CA) or multi-carrier operation. A carrier may also be referred to as a component carrier (CC), a layer, etc. The terms "carrier," "layer," and "CC" may thus be used interchangeably herein. A carrier used for the downlink may be referred to as a downlink CC, and a carrier used for the uplink may be referred to as an uplink CC. A combination of a downlink CC and an uplink CC may be referred to as a cell. It is also possible to have a cell consisting of a downlink CC. A UE 116 may be configured with multiple downlink CCs and one or more uplink CCs for carrier aggregation. BS 102 may be configured to support communications with UEs over multiple CCs on the downlink and/or uplink. Thus, a UE 116 may receive data and control information on one or more downlink CCs from one BS 102 or from multiple BSs 102 (e.g., single or multi-layer eNBs). The UE 116 may transmit data and control information on one or more uplink CCs to one or more BSs 102. Carrier aggregation may be used with both FDD and TDD component carriers. For DL carrier aggregation, multiple bits of ACK/NACK are fed back when multiple DL transmissions occur in one subframe.

Figure 2:
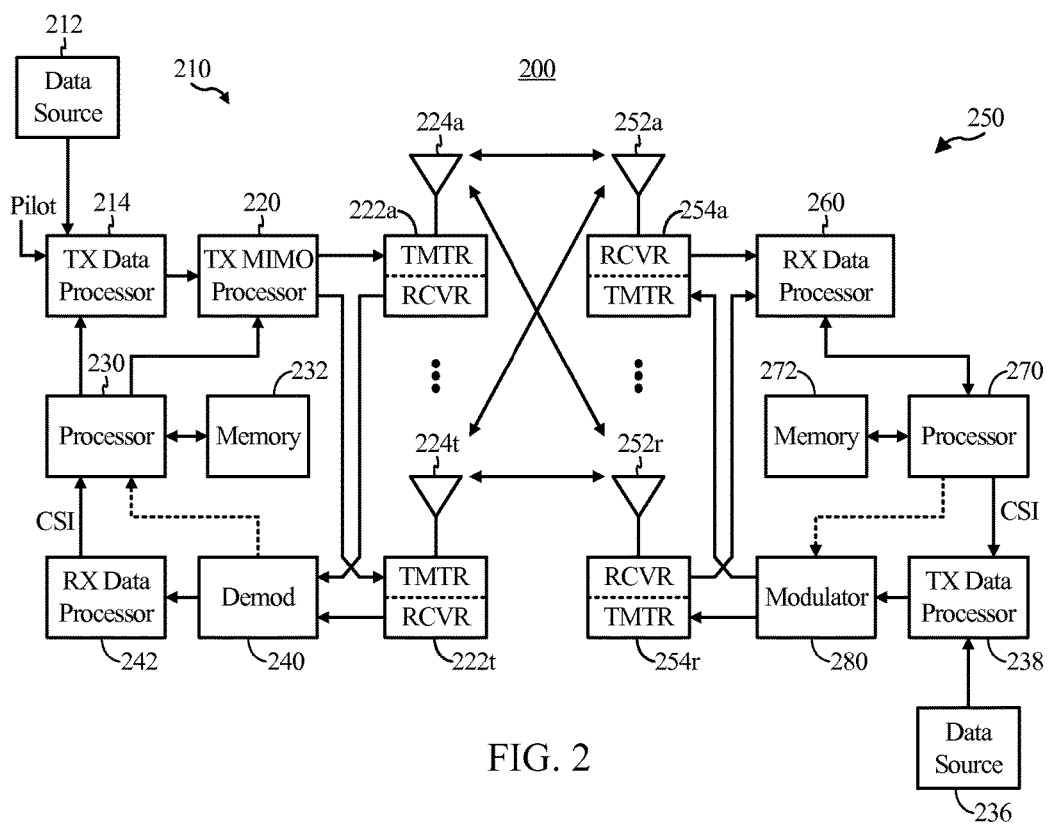
FIG. 2 is a block diagram of a communication system, according to aspects of the present disclosure.

FIG. 2 is a block diagram of an embodiment of a transmitter system 210 (also known as BS) and a receiver system 250 (also known as an UE) in a MIMO system 200. According to certain aspects, the transmitter system 210 and the receiver system 250 may correspond to the BS 110 and/or the user equipment 116/122, respectively, as illustrated in FIG. 1. At the transmitter system 210, traffic data for a number of data streams is provided from a data source 212 to a transmit (TX) data processor 214.

In an aspect, each data stream is transmitted over a respective transmit antenna. TX data processor 214 formats, codes, and interleaves the traffic data for each data stream based on a particular coding scheme selected for that data stream to provide coded data.

The coded data for each data stream may be multiplexed with pilot data using OFDM techniques. The pilot data is typically a known data pattern that is processed in a known manner and may be used at the receiver system to estimate the channel response. The multiplexed pilot and coded data for each data stream is then modulated (i.e., symbol mapped) based on a particular modulation scheme (e.g., binary phase shift keying (BPSK), quadrature phase shift keying (QPSK), M phase shift keying (M-PSK), or M quadrature amplitude modulation (M-QAM)) selected for that data stream to provide modulation symbols. The data rate, coding, and modulation for each data stream may be determined by instructions performed by processor 230.

The modulation symbols for all data streams are then provided to a TX MIMO processor 220, which may further process the modulation symbols (e.g., for OFDM). TX MIMO processor 220 then provides $N_T$ modulation symbol streams to $N_T$ transmitters (TMTR) 222a through 222t. In certain embodiments, TX MIMO processor 220 applies beamforming weights to the symbols of the data streams and to the antenna from which the symbol is being transmitted.

Each transmitter 222 receives and processes a respective symbol stream to provide one or more analog signals, and further conditions (e.g., amplifies, filters, and upconverts) the analog signals to provide a modulated signal suitable for transmission over the MIMO channel. $N_T$ modulated signals from transmitters 222a through 222t are then transmitted from $N_T$ antennas 224a through 224t, respectively.

At receiver system 250, the transmitted modulated signals are received by NR antennas 252a through 252r, and the received signal from each antenna 252 is provided to a respective receiver (RCVR) 254a through 254r. As will be described in greater detail below, the antenna switching diversity techniques described herein may help achieve diversity for communications in systems that utilize carrier aggregation (e.g., with a PCELL and at least one SCELL). Each receiver 254 conditions (e.g., filters, amplifies, and downconverts) a respective received signal, digitizes the conditioned signal to provide samples, and further processes the samples to provide a corresponding "received" symbol stream.

A receive (RX) data processor 260 then receives and processes the $N_R$ received symbol streams from $N_R$ receivers 254 based on a particular receiver processing technique to provide $N_T$ "detected" symbol streams. The RX data processor 260 then demodulates, deinterleaves, and decodes each detected symbol stream to recover the traffic data for the data stream. The processing by RX data processor 260 is complementary to that performed by TX MIMO processor 220 and TX data processor 214 at transmitter system 210.

A processor 270 periodically determines which pre-coding matrix to use. Processor 270 formulates a reverse link message comprising a matrix index portion and a rank value portion.

The reverse link message may comprise various types of information regarding the communication link and/or the received data stream. The reverse link message is then processed by a TX data processor 238, which also receives traffic data for a number of data streams from a data source 236, modulated by a modulator 280, conditioned by transmitters 254a through 254r, and transmitted back to transmitter system 210.

At transmitter system 210, the modulated signals from receiver system 250 are received by antennas 224, conditioned by receivers 222, demodulated by a demodulator 240, and processed by a RX data processor 242 to extract the reverse link message transmitted by the receiver system 250. Processor 230 then determines which pre-coding matrix to use for determining the beamforming weights and then processes the extracted message.

According to certain aspects, one or more of the processors (e.g., the TX Data processor 214, the TX MIMO processor 220, the processor 230, and/or the RX Data processor 242) of the transmitter system 210 and/or one or more processor (e.g., the TX Data processor 238, the processor 270, and/or the RX Data processor 260) of the receiver system 250 may be configured to perform operations described herein for determining timing of uplink transmissions when communicating using TDD/FDD aggregation.

In an aspect, logical channels are classified into Control Channels and Traffic Channels. Logical Control Channels comprise Broadcast Control Channel (BCCH), which is a downlink (DL) channel for broadcasting system control information. Paging Control Channel (PCCH) is a DL channel that transfers paging information. Multicast Control Channel (MCCH) is a point-to-multipoint DL channel used for transmitting Multimedia Broadcast and Multicast Service (MBMS) scheduling and control information for one or several Multicast Traffic Channels (MTCHs). Generally, after establishing an radio resource control (RRC) connection, this channel is only used by UEs that receive MBMS. Dedicated Control Channel (DCCH) is a point-to-point bi-directional channel that transmits dedicated control information used by UEs having an RRC connection. In an aspect, Logical Traffic Channels comprise a Dedicated Traffic Channel (DTCH), which is a point-to-point bi-directional channel, dedicated to one UE, for the transfer of user information. Also, a Multicast Traffic Channel (MTCH) is a point-to-multipoint DL channel for transmitting traffic data.

In an aspect, Transport Channels are classified into DL and UL. DL Transport Channels comprise a Broadcast Channel (BCH), Downlink Shared Data Channel (DL-SDCH), and a Paging Channel (PCH). The PCH may be used for support of discontinuous reception (DRX) by UEs. The use of DRX allows power savings by the UE (the DRX cycle is indicated by the network to the UE). The PCH is broadcasted over entire cell and mapped to physical layer (PHY) resources which can be used for other control/traffic channels. The UL Transport Channels comprise a Random Access Channel (RACH), a Request Channel (REQCH), an Uplink Shared Data Channel (UL-SDCH), and a plurality of PHY channels. The PHY channels comprise a set of DL channels and UL channels.

In an aspect, a channel structure is provided that preserves low PAPR (at any given time, the channel is contiguous or uniformly spaced in frequency) properties of a single carrier waveform.

Figure 3:
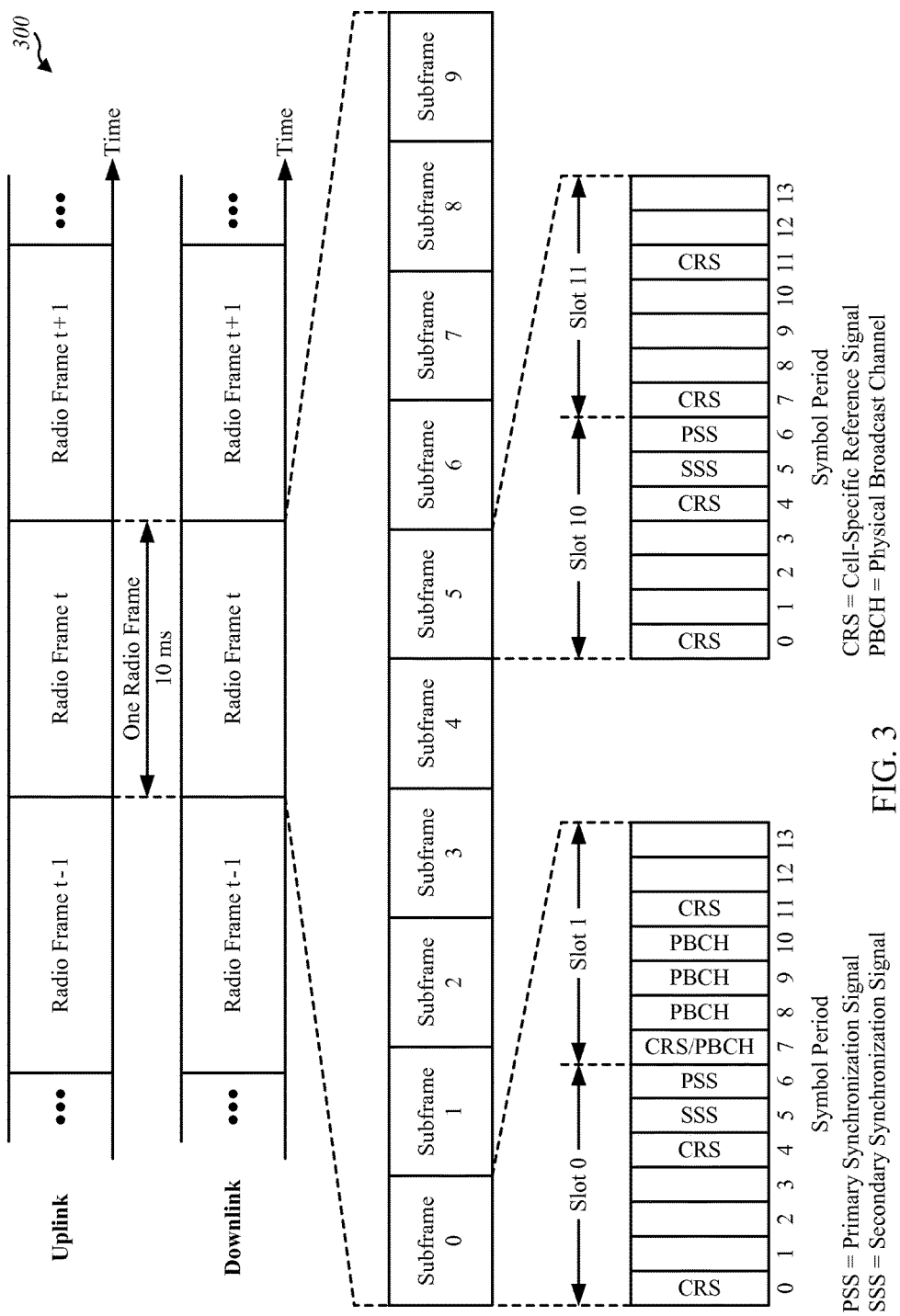
FIG. 3 illustrates an example frame structure, according to aspects of the present disclosure.

FIG. 3 shows an exemplary frame structure 300 for FDD in LTE. The transmission timeline for each of the downlink and uplink may be partitioned into units of radio frames. Each radio frame may have a predetermined duration (e.g., 10 milliseconds (ms)) and may be partitioned into 10 subframes with indices of 0 through 9. Each subframe may include two slots. Each radio frame may thus include 20 slots with indices of 0 through 19. Each slot may include L symbol periods, e.g., seven symbol periods for a normal cyclic prefix (as shown in FIG. 2) or six symbol periods for an extended cyclic prefix. The 2L symbol periods in each subframe may be assigned indices of 0 through 2L-1.

In LTE, an eNodeB may transmit a primary synchronization signal (PSS) and a secondary synchronization signal (SSS) on the downlink in the center 1.08 MHz of the system bandwidth for each cell supported by the eNodeB. The PSS and SSS may be transmitted in symbol periods 6 and 5, respectively, in subframes 0 and 5 of each radio frame with the normal cyclic prefix, as shown in FIG. 3. The PSS and SSS may be used by UEs for cell search and acquisition. During cell search and acquisition the terminal detects the cell frame timing and the physical-layer identity of the cell from which the terminal learns the start of the reference-signal sequence (given by the frame timing) and the reference-signal sequence of the cell (given by the physical layer cell identity). The eNodeB may transmit a cell-specific reference signal (CRS) across the system bandwidth for each cell supported by the eNodeB. The CRS may be transmitted in certain symbol periods of each subframe and may be used by the UEs to perform channel estimation, channel quality measurement, and/or other functions. The eNodeB may also transmit a Physical Broadcast Channel (PBCH) in symbol periods 0 to 3 in slot 1 of certain radio frames. The PBCH may carry some system information. The eNodeB may transmit other system information such as System Information Blocks (SIBs) on a Physical Downlink Shared Channel (PDSCH) in certain subframes. The eNodeB may transmit control information/data on a Physical Downlink Control Channel (PDCCH) in the first B symbol periods of a subframe, where B may be configurable for each subframe. The eNodeB may transmit traffic data and/or other data on a PDSCH in the remaining symbol periods of each subframe.

Figure 4:
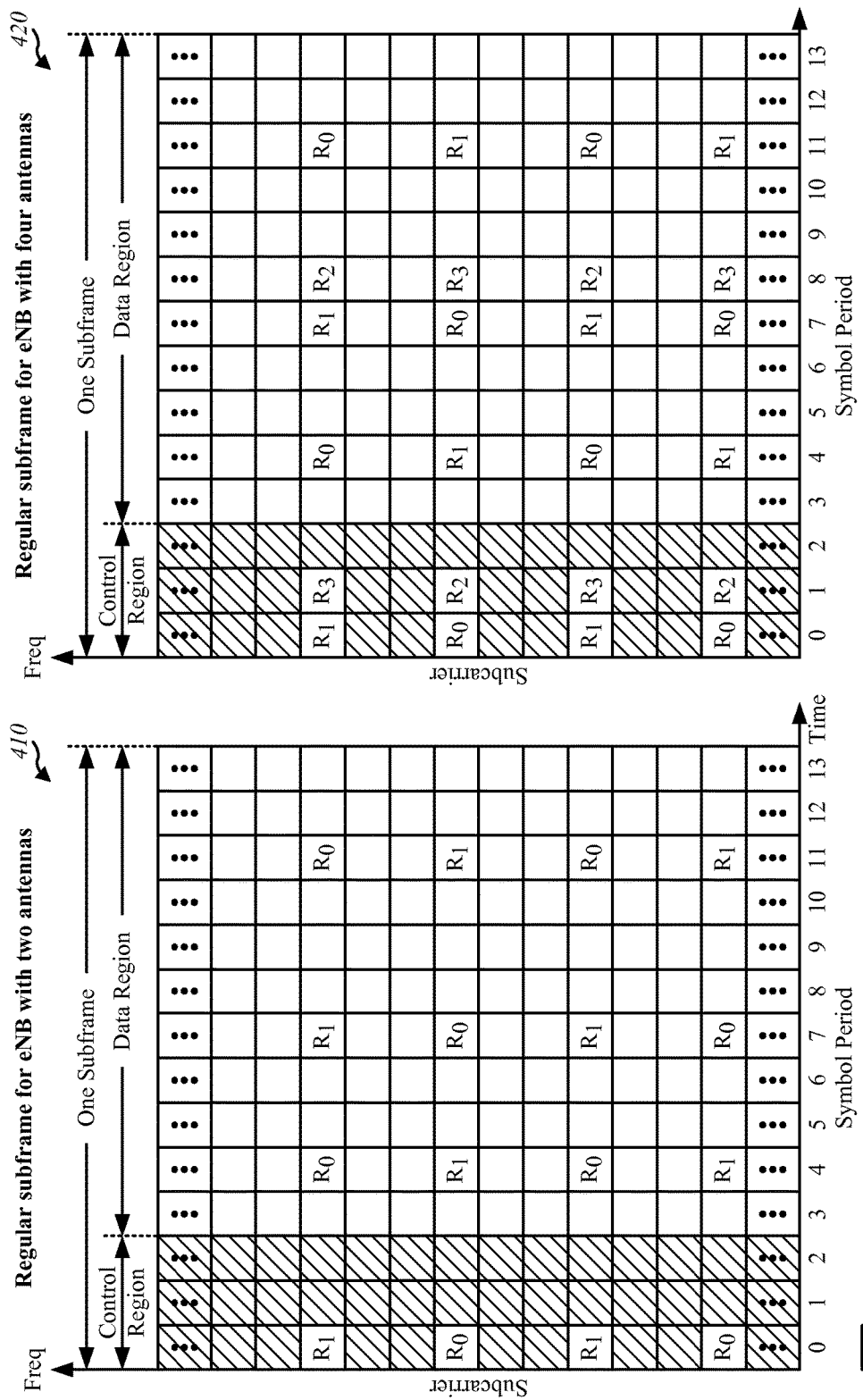
FIG. 4 illustrates an example subframe resource element mapping, according to aspects of the present disclosure.

FIG. 4 shows two exemplary subframe formats 410 and 420 for downlink transmissions from an eNodeB using the normal cyclic prefix. The available time frequency resources for the downlink may be partitioned into resource blocks. Each resource block may cover 12 subcarriers in one slot and may include a number of resource elements. Each resource element may cover one subcarrier in one symbol period and may be used to send one modulation symbol, which may be a real or complex value.

Subframe format 410 may be used for an eNodeB equipped with two antennas. A CRS may be transmitted from antennas 0 and 1 in symbol periods 0, 4, 7 and 11. A reference signal is a signal that is known a priori by a transmitter and a receiver and may also be referred to as a pilot. A CRS is a reference signal that is specific for a cell, e.g., generated based on a cell identity (ID). In FIG. 4, for a given resource element with label $R_a$, a modulation symbol (e.g., a CRS) may be transmitted on that resource element from antenna a, and no modulation symbols may be transmitted on that resource element from other antennas. Subframe format 420 may be used for an eNodeB equipped with four antennas. A CRS may be transmitted from antennas 0 and 1 in symbol periods 0, 4, 7 and 11 and from antennas 2 and 3 in symbol periods 1 and 8. For both subframe formats 410 and 420, a CRS may be transmitted on evenly spaced subcarriers, which may be determined based on cell ID. Different eNodeBs may transmit their CRSs on the same or different subcarriers, depending on their cell IDs. For both subframe formats 410 and 420, resource elements not used for the CRS may be used to transmit data (e.g., traffic data, control data, and/or other data).

The PSS, SSS, CRS, and PBCH in LTE are described in 3GPP TS 36.211, entitled "Evolved Universal Terrestrial Radio Access (E-UTRA); Physical Channels and Modulation," which is publicly available.

An interlace structure may be used for each of the downlink and uplink for FDD in LTE. For example, Q interlaces with indices of 0 through Q−1 may be defined, where Q may be equal to 4, 6, 8, 10, or some other value. Each interlace may include subframes that are spaced apart by Q subframes. In particular, interlace q may include subframes q, q+Q, q+2Q, etc., where $q \in \{0, \ldots, Q-1\}$.

The wireless network may support hybrid automatic retransmission request (HARQ) for data transmission on the downlink and uplink. For HARQ, a transmitter (e.g., an eNodeB) may send one or more transmissions of a packet until the packet is decoded correctly by a receiver (e.g., a UE) or some other termination condition is encountered. For synchronous HARQ, all transmissions of the packet may be sent in subframes of a single interlace. For asynchronous HARQ, each transmission of the packet may be sent in any subframe.

A UE may be located within the coverage area of multiple eNodeBs. One of these eNodeBs may be selected to serve the UE. The serving eNodeB may be selected based on various criteria such as received signal strength, received signal quality, pathloss, etc. Received signal quality may be quantified by a signal-to-noise-and-interference ratio (SINR), a reference signal received quality (RSRQ), or some other metric. The UE may operate in a dominant interference scenario in which the UE may observe high interference from one or more interfering eNodeBs. For example, an eNodeB may restrict access to only a certain group of UEs. The group may be referred to as a closed subscriber group (CSG), and the restricting eNodeB may be referred to as a closed subscriber group eNodeB or cell. If a UE that is not a member of the CSG is near the CSG eNodeB, then the UE will receive signals from the CSG eNodeB at relatively high strength, while being denied access to the CSG eNodeB. The UE will attempt to associate with another eNodeB and receive service from the other eNodeB, while signals from the nearby CSG eNodeB will act as interference to communications between the UE and the serving eNodeB.

Carrier Aggregation

Certain types of devices, such as LTE-Advanced UEs, may use spectrum in bandwidths of up to 20 MHz per component carrier allocated in a carrier aggregation of up to a total of 100 MHz (5 component carriers) for transmission in each direction. For LTE-Advanced mobile systems, two types of carrier aggregation (CA) methods have been proposed, continuous CA and non-continuous CA. Both non-continuous and continuous CA involves aggregating multiple LTE/component carriers to serve a single LTE-Advanced UE.

According to various embodiments, a UE operating in a multicarrier system (also referred to as carrier aggregation) is configured to aggregate certain functions of multiple carriers, such as control and feedback functions, on the same carrier, which may be referred to as a "primary carrier" or "anchor carrier." The remaining carriers that depend on the primary carrier for support are referred to as associated secondary carriers. For example, a UE may aggregate control functions such as those provided by a dedicated channel (DCH), nonscheduled grants, a physical uplink control channel (PUCCH), and/or a physical downlink control channel (PDCCH). CA can improve overall transmission efficiency, in that resources on the primary carrier are used for control functions (as well as data transmissions), while the secondary carriers are available for data transmission. Thus, the ratio of transmitted data to control functions may be increased by CA, when compared to non-CA techniques.

Figure 5:
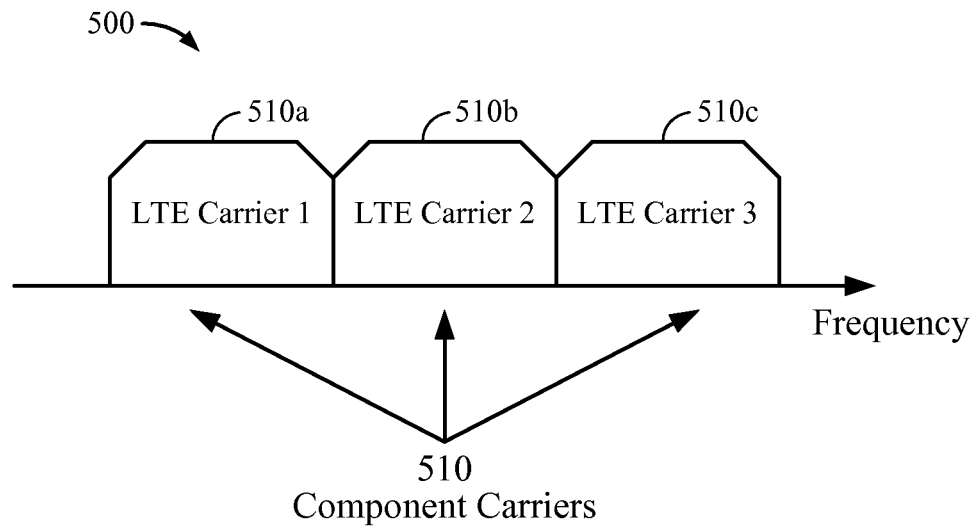
FIG. 5 illustrates continuous carrier aggregation, in accordance with certain aspects of the disclosure.

FIG. 5 illustrates continuous CA 500, in which multiple available component carriers 510 adjacent to each other are aggregated.

Figure 6:
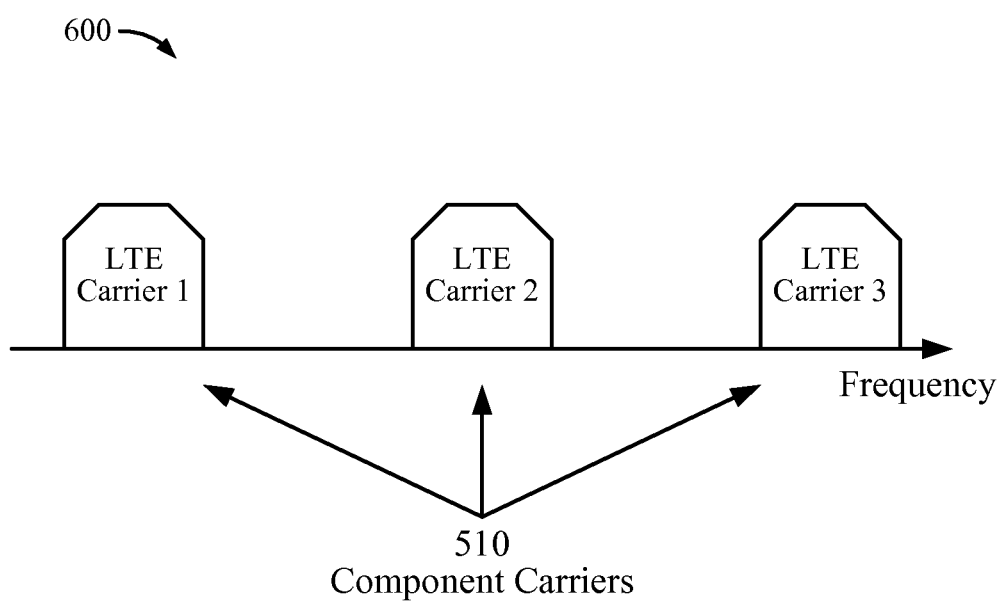
FIG. 6 illustrates non-continuous carrier aggregation, in accordance with certain aspects of the disclosure.

FIG. 6 illustrates non-continuous CA 600, in which multiple available component carriers 510, separated along the frequency band, are aggregated.

Figure 7:
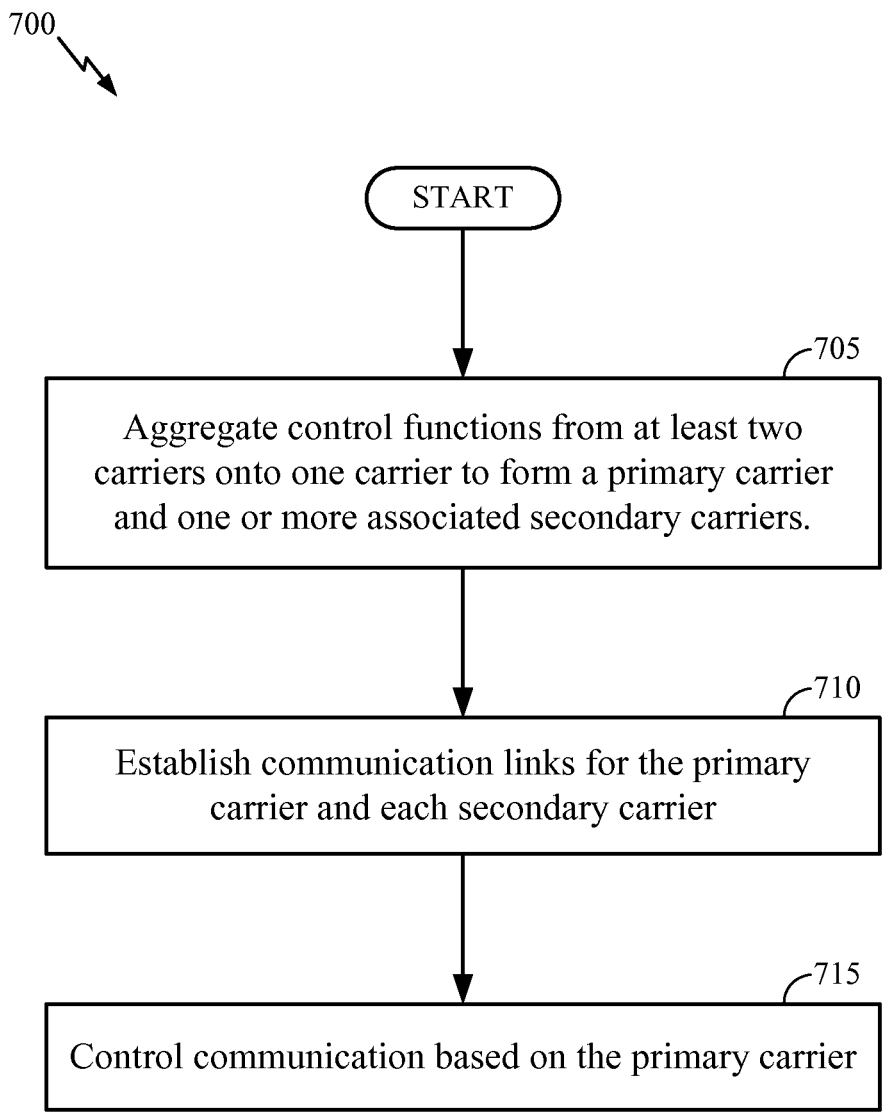
FIG. 7 illustrates example operations, in accordance with certain aspects of the disclosure.

FIG. 7 illustrates a method 700 for controlling radio links in a multiple carrier wireless communication system by grouping physical channels according to one example. As shown, the method includes, at block 705, aggregating control functions from at least two carriers onto one carrier to form a primary carrier and one or more associated secondary carriers. For example, all of the control functions for component carriers 510a, 510b, and 510c in FIG. 5 may be aggregated on component carrier 510a, which acts as the primary carrier for the aggregation of carriers 510a, 510b, and 510c. Next at block 710, communication links are established for the primary carrier and each secondary carrier. For example, a UE (e.g., UE 116 and/or 122) associating with an eNodeB (e.g., eNodeB 102) receives configuration information regarding the component carriers 510a, 510b, and 510c (e.g., bandwidth of each component carrier), and configuration information indicating mappings between control information to be received on primary carrier 510a and associated secondary carriers 510b and 510c. Then, communication is controlled based on the primary carrier in block 715. For example, an eNodeB may transmit a PDCCH to a UE on primary carrier 510a conveying a downlink grant to the UE for a PDSCH directed to the UE and transmitted by the eNodeB on secondary carrier 510b.

Certain types of devices, such as UEs operating in accordance with LTE Release 10 and later releases, may be configured to communicate using multiple component carriers (CCs).

Figure 8:
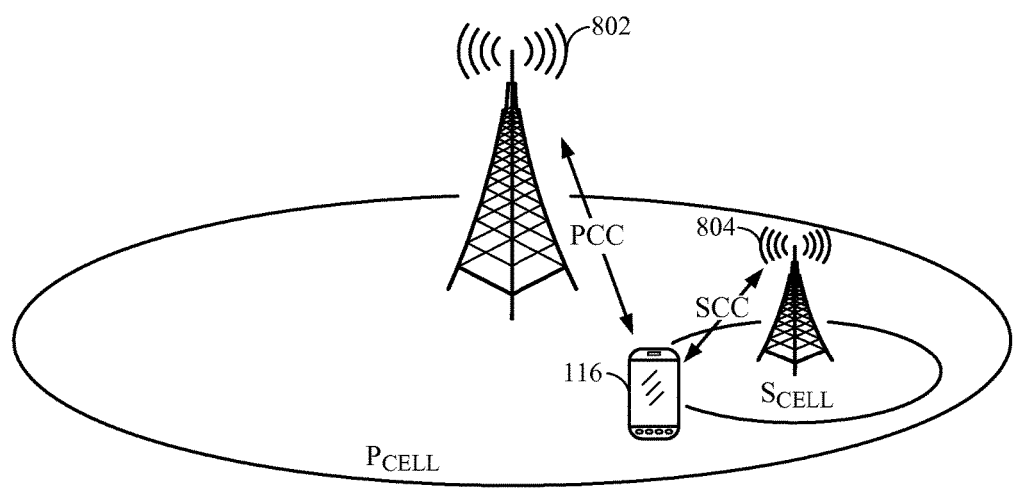
FIG. 8 illustrates a wireless communication system using carrier aggregation, in accordance with certain aspects of the present disclosure.

For example, as illustrated in FIG. 8, a CA UE 116 may communicate with a first eNodeB 802, via one CC designated as a primary CC (PCC), while also communicating with a second eNodeB 804 via a CC designated as a secondary CC (SCC). PCCs may be semi-statically configured by higher layers on a per user equipment (UE) basis. In some cases, Acknowledgement/Negative Acknowledgement (ACK)/(NAK), channel quality information (CQI) and scheduling requests (SRs), when transmitted on a physical uplink control channel (PUCCH), may be transmitted on a PCC.

Antenna diversity, also known as space diversity or spatial diversity, generally refers to a scheme that uses two or more antennas to improve the quality and reliability of a wireless link. Antenna diversity can be useful in certain scenarios where there is no clear line-of-sight (LOS) between transmitter and receiver. Instead, the signal is reflected along multiple paths before finally being received. Antenna diversity is especially effective at mitigating these multipath situations. This is because multiple antennas offer a receiver several observations of the same signal (referring to receive or Rx diversity). Each antenna will experience a different interference environment. Thus, if one antenna is experiencing a deep fade, it is likely that another has a sufficient signal. Collectively such a system can provide a robust link (via diversity gain). While this is primarily seen in receiving systems (diversity reception), the analog has also proven valuable for transmitting systems (Tx diversity) as well.

In UEs with multiple antennas for Rx (or Tx) diversity, an antenna switch diversity (ASDIV) scheme may be utilized to switch which antennas are involved depending on operating conditions. For example, antennas may be selected (or de-selected) based on received signal strength measurements, such as reference signal receive power (RSRP) measurements.

Opportunistic Antenna Switch Diversity (Asdiv) in Carrier Aggregation

Aspects of the present disclosure provide techniques for switching antennas used by a UE for achieving receive diversity for uplink communications in systems with a $P_{CELL}$ and at least one $S_{CELL}$. Those skilled in the art will recognize that the techniques may also be used for switching antennas used for achieving transmit diversity for downlink communications.

As will be described in greater detail below, the techniques may be used in UEs with a single physical switch used for both $P_{CELL}$ and $S_{CELL}$ antennas or in UEs with separate physical switches for $P_{CELL}$ and $S_{CELL}$ antennas. Single physical switches may be desirable, for example, to reduce cost. Separate physical switches may be used, for example, for UEs operating in scenarios where $P_{CELL}$ and $S_{CELL}$ carriers are sufficiently separated in frequency.

There are various scenarios in which different antennas used as primary receive and diversity antennas may be switched. For example, the behavior of a UE may vary depending on how the UE is held. For example, the primary antenna may be blocked compared to the diversity antenna depending on the position of the UE. Hence, better uplink transmission quality may be obtained when the TX antennas are switched. Possible benefits of Antenna Switch Diversity (ASDIV) include improved network capacity, reduced current consumption, lower Tx power, less dropped calls, and/or lesser power allocation to channel under power control.

Figure 9:
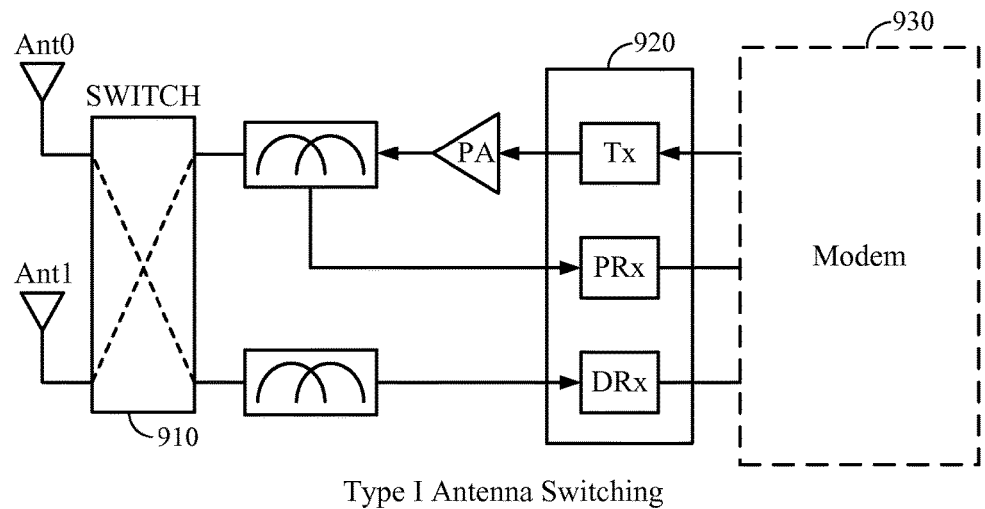
FIGS. 9 and 10 illustrate examples of antenna switching algorithms.

There may be various types of ASDIV switching mechanisms used in UEs. For example, FIG. 9 illustrates a first type of ASDIV switching, referred to herein as "Type I" switching. As illustrated, a switch 910 may be used to switch between two antennas (Ant0 and Ant1) used as primary and diversity antennas to transmit/receive module 920 and, ultimately, to a modem 930. In other words, switch 910 may be used to selectively route signals from each of the antennas to the modem 930, via a primary receive (PRx) chain or a diversity receive (DRx) chain.

The switching may be based on various measured conditions. For example, the switching may be triggered when a difference between reference signal receive power (RSRP) on PRx and DRx (referred to herein as RSRP Delta) is greater than an upper threshold value (RSRPThresholdHi), when the average of RSRP Delta is greater than a lower threshold value (RSRPThresholdLo), and/or when a maximum transmit power limit (MTPL) has been reached for some percentage of a time period (e.g., as tracked by a counter over the given period). Trigger parameters, such as these, may be configurable (e.g., by an operator, manufacturer, or user).

An antenna switching algorithm may first decide whether to switch antennas (e.g., swap primary and diversity antennas or, in some cases, enable a diversity antenna) and subsequently, whether to stay on the new antenna or switch back to the previous configuration. The decision to switch back may be based on the various conditions (indicative of the impact of the new configuration), such as received transmit power control (TPC) commands that cause the power to rise above a defined threshold value (e.g., 10 dB) on the new antenna (which may be specified by a parameter "Tx_Power_Jump_Threshold"), and/or the MTPL count on the new antenna exceeding the MTPL count on previous antenna (e.g., by 200 over a 640 ms period).

Figure 10:
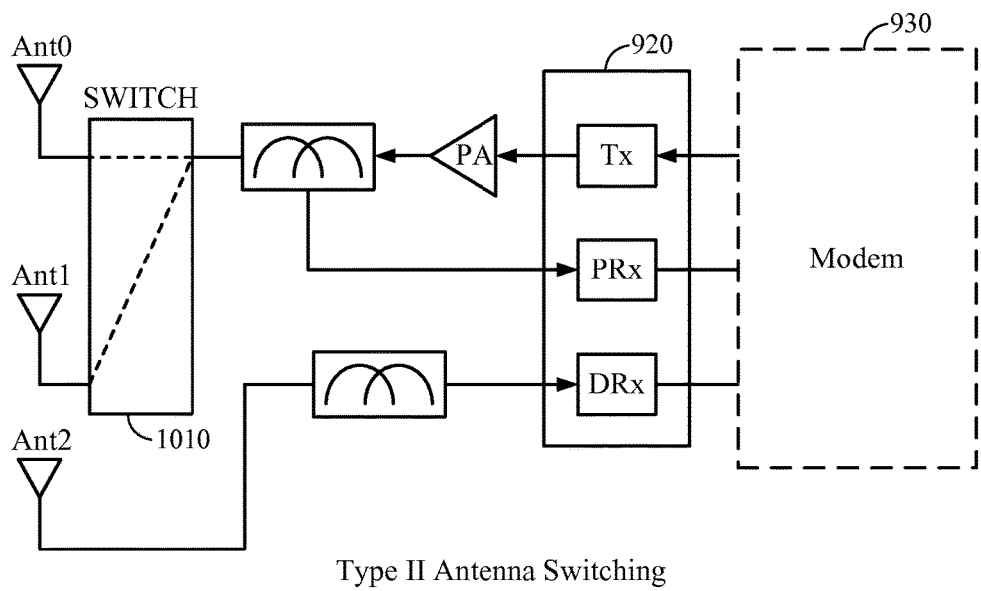

FIG. 10 illustrates a second type of ASDIV switching, referred to herein as "Type II" switching. As illustrated, a switch 1010 may be used to switch between two antennas (Ant0 and Ant1) used for PRx to transmit/receive module 920 and, ultimately, to the modem 930, while the antenna (Ant 2) for DRx may not be involved in the switching. The switching between antennas for PRx may be based on various conditions, such as when the primary RSRP (for a currently selected antenna) measured over a period (e.g., of 8 measurement cycles or about 5 seconds) has dropped persistently by a threshold value (RSRPThresholdHi), when the delta between the RSRPs measured on the primary and secondary is greater than a threshold value (Rx0Rx1DiffType2), when the RSRP measured on the primary antenna is lower than a threshold value (RSRPThreshType2), when the MTPL counter is above a certain value over a given period, or a combination of these conditions.

As with Type I switching, a Type II antenna switching algorithm may first decide whether to switch and, subsequently, whether to stay on the new antenna or switch back based on a drop in RSRP Delta on the new antenna, TPC commands cause the transmit power to rise, the MTPL count on new antenna is greater than the MTPL count on the previous antenna, or some combination.

Unfortunately, ASDIV algorithms have conventionally been designed mainly for single-cell scenarios, which makes them less than optimal for CA scenarios with more than one serving cell (e.g., a $P_{CELL}$ and at least one $S_{CELL}$). In such scenarios, conventional algorithms typically trigger a switch solely based on the $P_{CELL}$ conditions (e.g., the aforementioned measured RSRP or Tx power conditions). These algorithms typically use the same control signals to switch the antennas for both the $P_{CELL}$ and $S_{CELL}$. In other words, in these cases, the $S_{CELL}$ blindly follows the switching decision made by the $P_{CELL}$.

As a result, the conventional approach has a number of drawbacks when applied to CA. For example, the $P_{CELL}$ does not always represent the overall performance of the system. For example, the $P_{CELL}$ RX0 and RX1 (receive signals through Ant 0 and Ant 1) may be in good RSRP conditions, but the $S_{CELL}$ RX0 may be worse than the $S_{CELL}$ RX1.

Under the conventional scheme, the performance of the secondary cells (on secondary component carriers SCC1, SCC2, . . . , SCCX) will be ignored in deciding and triggering a switch. This may lead to a net performance degradation if the adverse impact on the $S_{CELL}$ is greater than any improvement in the $P_{CELL}$. This is illustrated by an example where the $S_{CELL}$ primary data receiver (PRx) has better RSRP conditions than the DRx of $S_{CELL}$, but due to some $P_{CELL}$ switch decision, the UE will blindly follow the same switch decision on $S_{CELL}$ to the weaker antenna. In this case, the performance of the $S_{CELL}$ will be degraded.

Aspects of the present disclosure, however, may avoid this type of performance degradation by effectively isolating the $P_{CELL}$ and $S_{CELL}$ switch decisions in some cases, which may result in overall better system performance. In certain cases, switching algorithms may consider conditions in both the $P_{CELL}$ and $S_{CELL}$ when making switching decisions.

Figure 11:
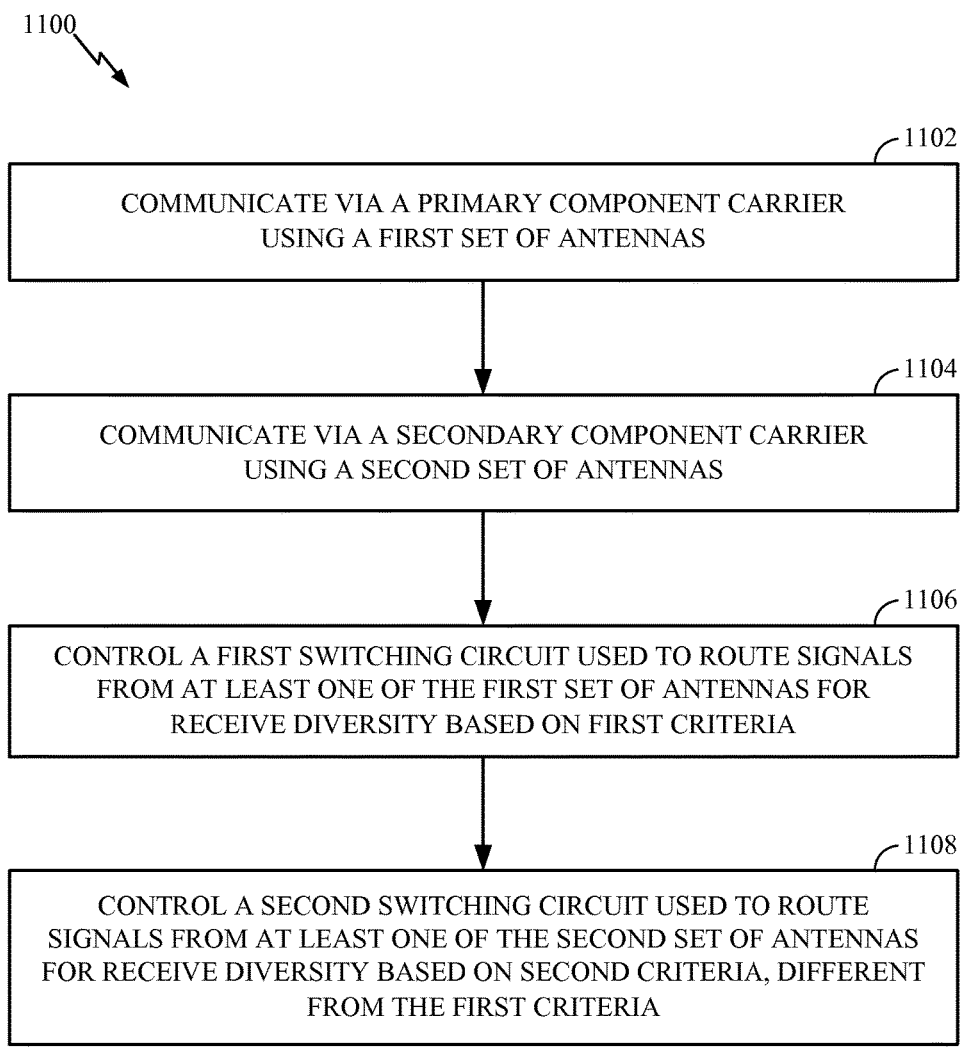
FIG. 11 illustrates example operations for antenna switching according to one algorithm, in accordance with certain aspects of the disclosure.

For example, FIG. 11 illustrates example operations 1100 for antenna switch diversity (ASID) that may be performed by a UE capable of CA, in accordance with certain aspects of the disclosure. The operations 1100 may allow for independent switch criteria and switch decisions for each (e.g., primary and secondary) serving cell in the context of CA. The operations 1100 may be suitable, for example, when the $P_{CELL}$ and $S_{CELL}$ switching is performed using separate physical switches allowing for independent control, such as in the example embodiments described below with reference to FIGS. 12-14.

Operations 1100 begin, at 1102, by communicating via a primary component carrier using a first set of antennas. At 1104, the UE communicates via a secondary component carrier using a second set of antennas. At 1106, the UE controls a first switching circuit used to route signals from at least one of the first set of antennas for receive diversity based on first criteria and, at 1108, the UE controls a second switching circuit used to route signals from at least one of the second set of antennas for receive diversity based on second criteria, different from the first criteria.

Figure 12:
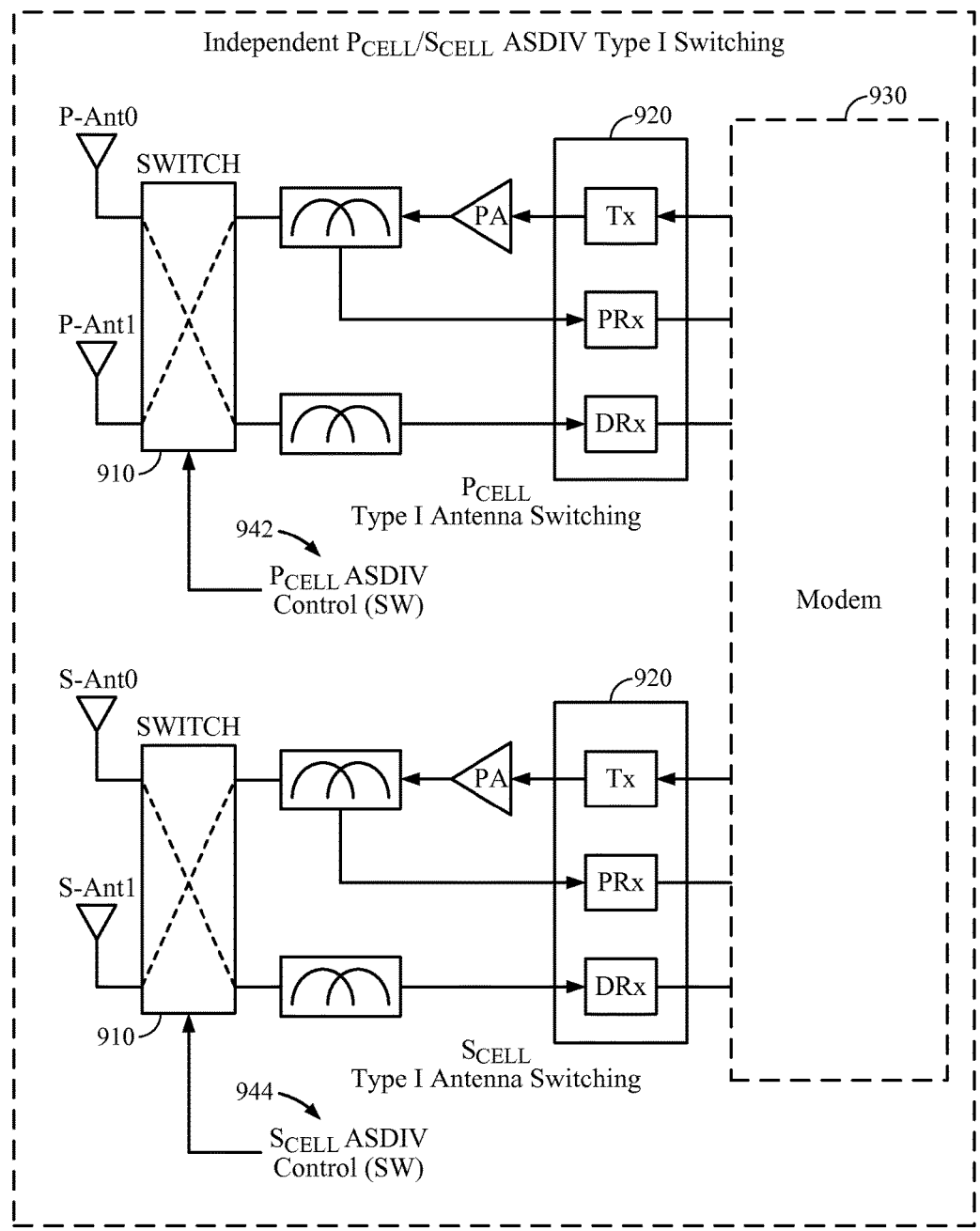
FIGS. 12-14 illustrate examples of antenna switching algorithms, in accordance with certain aspects of the disclosure.
Figure 13:
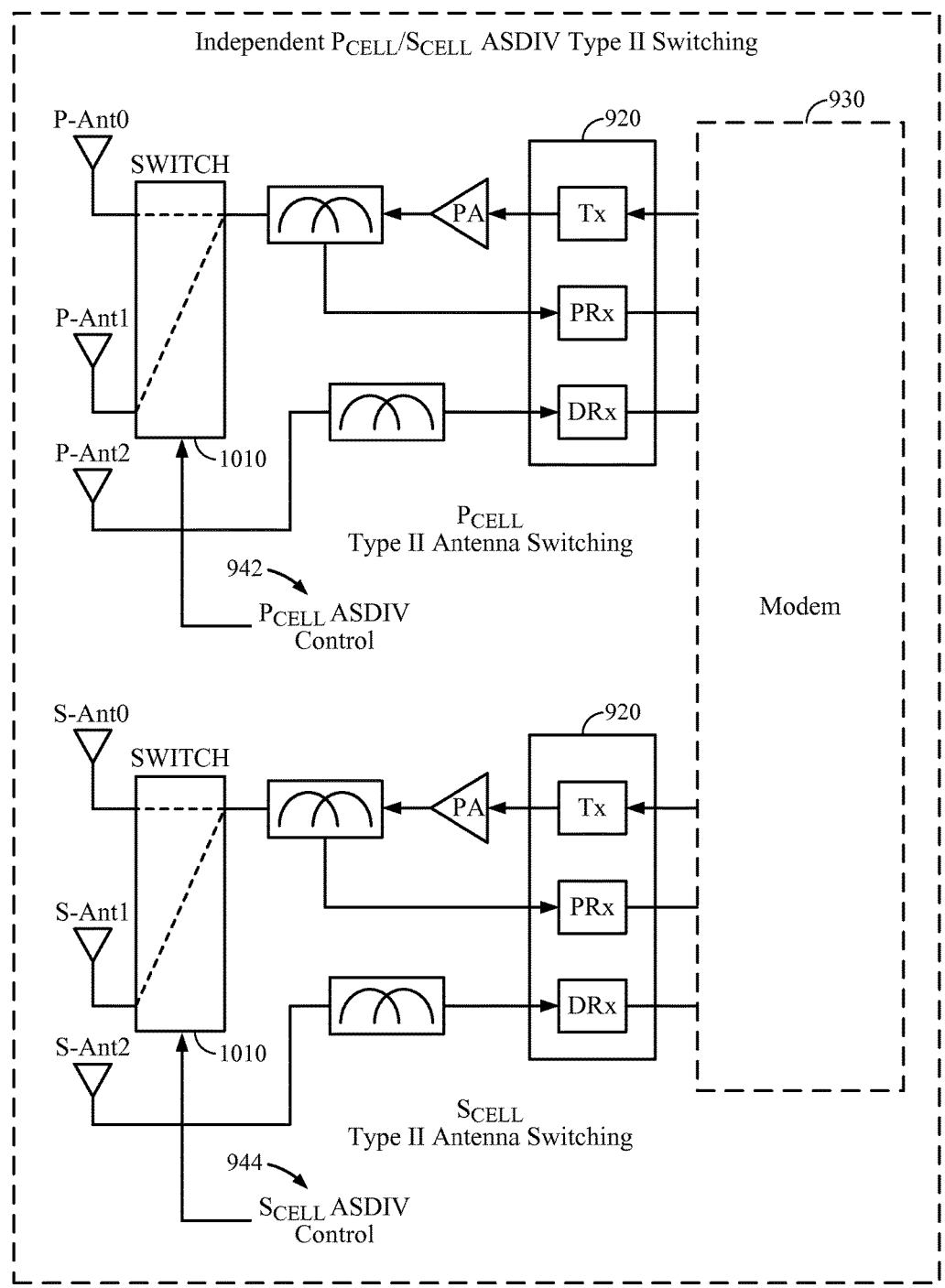

FIGS. 12 and 13 illustrate example arrangements in which the operations 1100 may be performed to control different switching circuits for the $P_{CELL}$ and $S_{CELL}$, based on first and second criteria, via independent control signals ($P_{CELL}$ ASDIV Control 942 and $S_{CELL}$ ASDIV Control 944). While separate control signals are shown to control separate switches 910 for the $P_{CELL}$ and $S_{CELL}$, the actual control may be performed via software (e.g., controlling switches 910 via bits in a register).

As illustrated in FIG. 12, for Type I switching the $P_{CELL}$ ASDIV Control signal(s) 942 may be used to control which $P_{CELL}$ antenna ports (P-Ant0/P-Ant1) are routed to the $P_{CELL}$ primary receiver (PRx) or diversity receiver (DRx) paths, while the $S_{CELL}$ ASDIV Control signal(s) 944 may be used to control which $S_{CELL}$ antenna ports (S-Ant0/S-Ant1) are routed to the $S_{CELL}$ primary receiver (PRx) or diversity receiver (DRx) paths. The Type I switching for each cell ($P_{CELL}$ and $S_{CELL}$) may be performed as described above with reference to FIG. 9, but with a separate switch 910 provided for each. In other words, $P_{CELL}$ ASDIV Control signal(s) 942 may control switch 910 for the $P_{CELL}$ to switch between two antennas (P-Ant0 and P-Ant1) used as primary and diversity antennas to a $P_{CELL}$ transmit/receive module 920 and, ultimately, to the modem 930. Similarly, $S_{CELL}$ ASDIV Control signal(s) 944 may control switch 910 for the $S_{CELL}$ to switch between two antennas (S-Ant0 and S-Ant1) used as primary and diversity antennas to an $S_{CELL}$ transmit/receive module 920 and, ultimately, to the modem 930.

Independent control of the $P_{CELL}$ and $S_{CELL}$ antenna switching may help avoid the potential degradation in system performance described above, when the $S_{CELL}$ switching blindly follows the $P_{CELL}$, resulting in an adverse affect on $S_{CELL}$ performance.

As illustrated in FIG. 13, for Type II switching, the $P_{CELL}$ ASDIV Control signal(s) 942 may be used to control which of $P_{CELL}$ antenna ports (P-Ant0/P-Ant1) is routed to the $P_{CELL}$ PRx while P-Ant2 is dedicated to DRx. Similarly, the $S_{CELL}$ ASDIV Control signal(s) 944 may be used to control which of $S_{CELL}$ antenna ports S-Ant0/S-Ant1 is routed to the $S_{CELL}$ PRx, while S-Ant2 is dedicated to DRx. The Type II switching for each cell ($P_{CELL}$ and $S_{CELL}$) may be performed as described above with reference to FIG. 10, but with a separate switch 1010 provided for each. In other words, $P_{CELL}$ ASDIV Control signal(s) 942 may control switch 1010 for the $P_{CELL}$ to switch between two antennas (P-Ant0 and P-Ant1) used for PRx to $P_{CELL}$ transmit/receive module 920 and, ultimately, to the modem 930. Similarly, $S_{CELL}$ ASDIV Control signal(s) 944 may control switch 1010 for the $S_{CELL}$ to switch between two antennas (S-Ant0 and S-Ant1) used for PRx to $S_{CELL}$ transmit/receive module 920 and, ultimately, to the modem 930.

Figure 14:
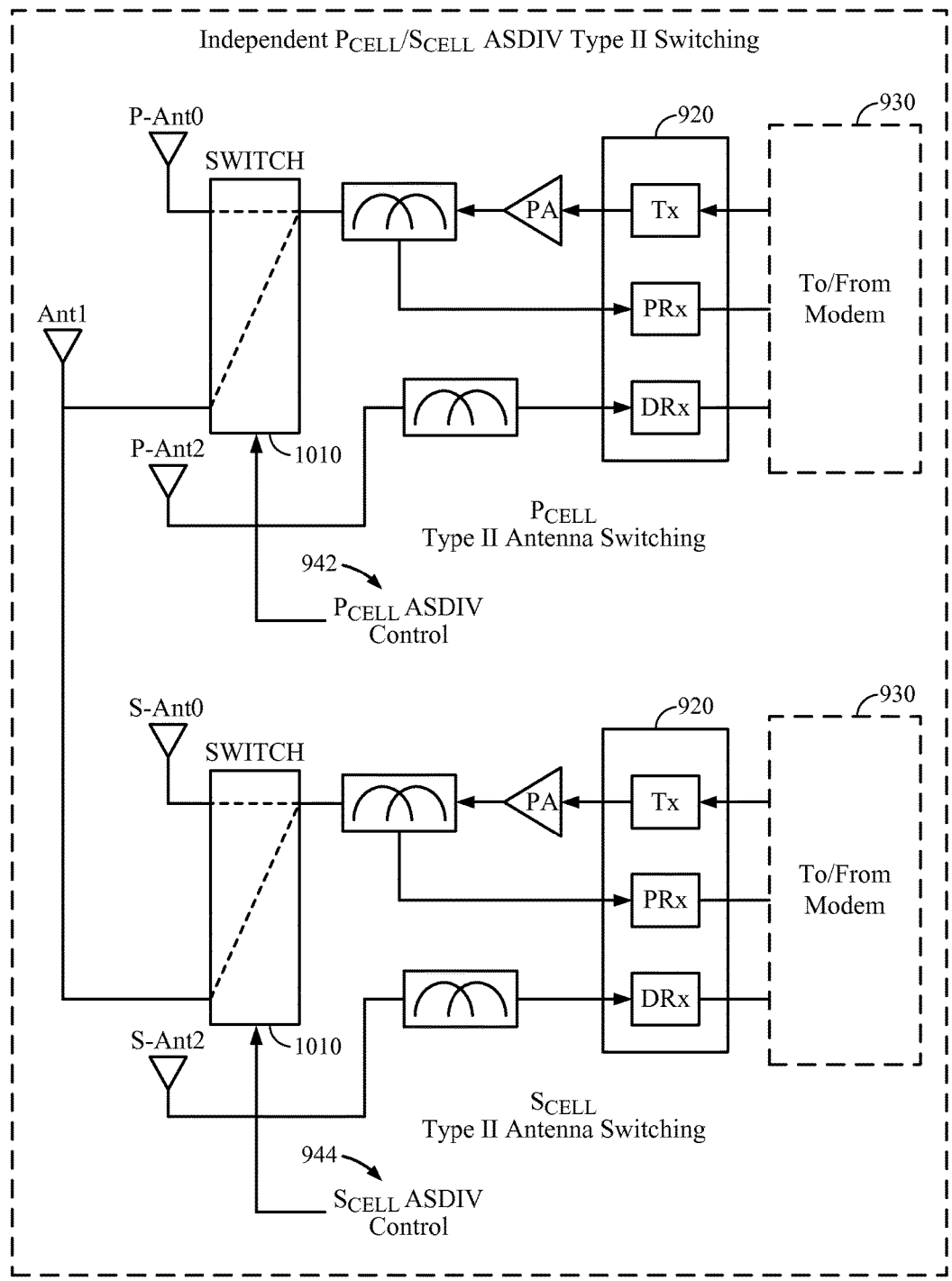

FIG. 14 illustrates a scenario similar to FIG. 13, but with five antennas instead of six. In this example, a single antenna acting as Ant1 is shared between $P_{CELL}$ and $S_{CELL}$. In this case the switch 1010 for each of $P_{CELL}$ and $S_{CELL}$ is used to select between an independent Ant 0 (P-Ant0/S-Ant0) or the shared Ant 1.

While FIGS. 12, 13 and 14 illustrate relatively simple switching scenarios that involve selecting one of a pair of antennas, for both $P_{CELL}$ and $S_{CELL}$, the techniques described herein may be applied to more complicated scenarios. For example, in some MIMO cases, $P_{CELL}$ and $S_{CELL}$ may each have 4 or more antennas and the switching algorithm may be used to select the best two antennas (e.g., one or more for PRx and one or more for DRx). As noted above, the techniques may also be applied to select between $P_{CELL}$ and $S_{CELL}$ antennas for transmit diversity.

As noted above, a wide variety of independent criteria may be used to control switching of the $P_{CELL}$ and $S_{CELL}$ antennas, for example, based on RSRP measurements and Tx power. In some cases, the particular criteria may depend on a particular operating scenario.

In inter-band CA (High Band/Low Band, e.g., bands B41+B39) scenarios, with different physical antenna ports for each band (for example two RF antennas for B41 and 2RF antennas for B39), the ASDIV can be easily isolated for the primary component carrier (PCC) and secondary component carrier (SCC). In this case, as the RF ports used by PCC and SCC are different, there may be little or no impact of switching of different carriers on each other, and the switching conditions can be defined on each carrier independently. Therefore, the same switch TypeI/TypeII triggering conditions and switch-back trigger conditions, as described above, may be applied for each carrier.

As noted above, the present disclosure also provides techniques that may be applied in scenarios where a UE uses a single physical switch for both $P_{CELL}$ and $S_{CELL}$ antennas. In such cases, a goal may be to avoid switching based on a trigger in one cell that would have an adverse affect on the other cell.

Figure 15:
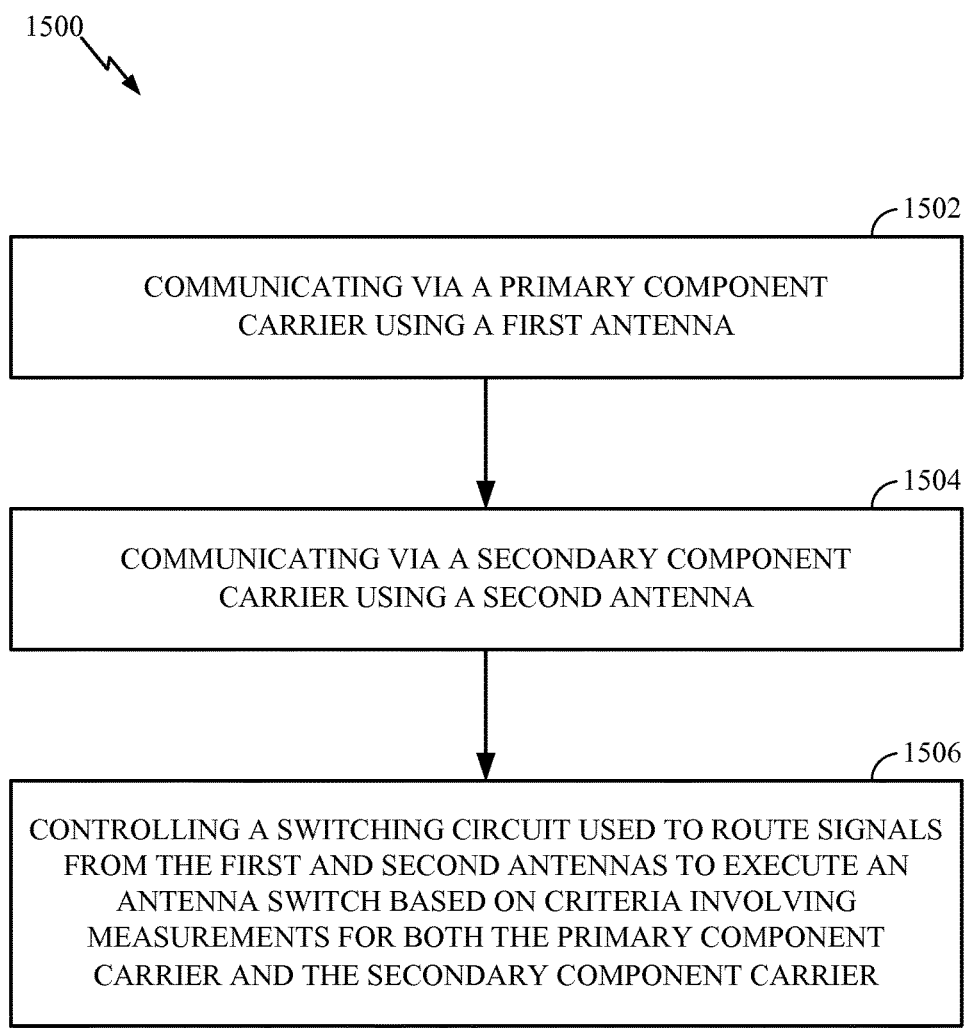
FIG. 15 illustrates example operations for antenna switching according to another algorithm, in accordance with certain aspects of the disclosure.

FIG. 15 illustrates example operations 1500 for ASID that may be performed, for example, by a UE that switches $P_{CELL}$ and $S_{CELL}$ antennas using a single physical switch, such as in the example embodiment described below with reference to FIGS. 16A and 16B.

Operations 1500 begin, at 1502, by communicating via a primary component carrier using at least a first antenna. At 1504, the UE communicates via a secondary component carrier using at least a second antenna. At 1506, the UE controls a switching circuit used to route signals from the first and second antennas to execute an antenna switch, based on criteria involving measurements for both the primary component carrier and the secondary component carrier.

Figure 16A:
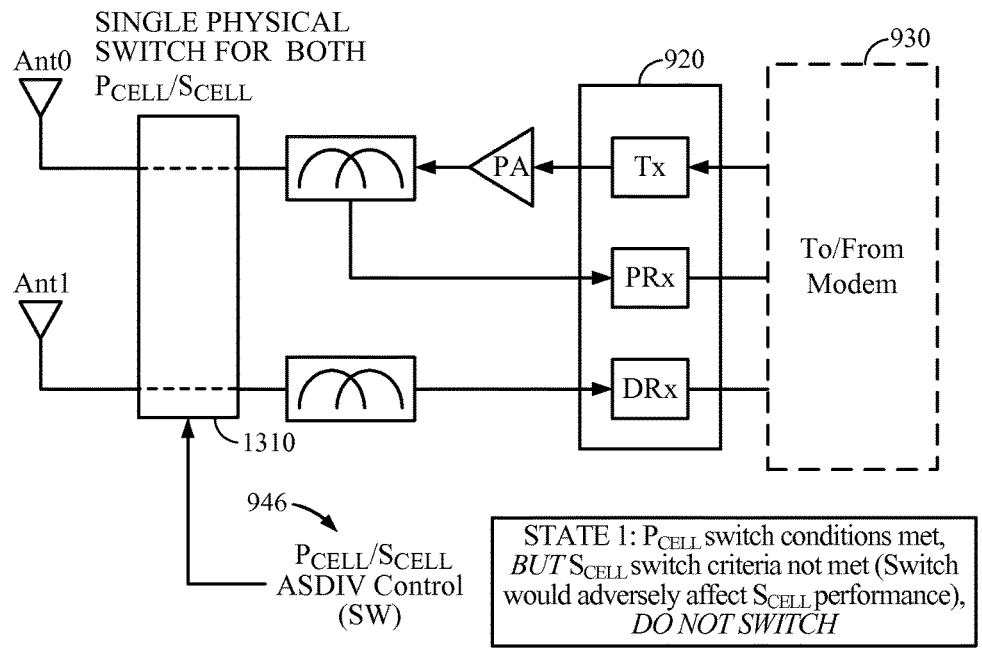
FIGS. 16A and 16B illustrate examples of switching in accordance with the operations of FIG. 15.
Figure 16B:
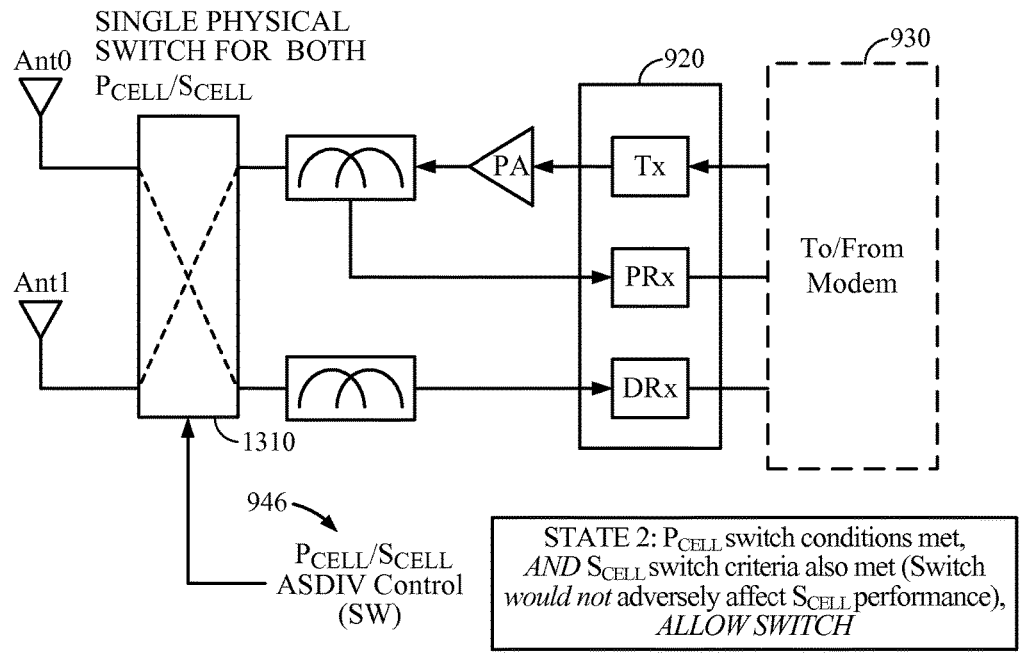

FIGS. 16A and 16B illustrate how a single physical switch 1310 may be controlled by a common control signal ($P_{CELL}$/$S_{CELL}$ ASDIV Control 946) based on measurements in both the $P_{CELL}$ and $S_{CELL}$. In other words, $P_{CELL}$/$S_{CELL}$ ASDIV Control 946 may control the switch 1310 to switch between two antennas (Ant0 and Ant1) used as primary and diversity antennas, for both $P_{CELL}$ and $S_{CELL}$, to transmit/receive module 920 and, ultimately, to the modem 930. As illustrated in FIG. 16A, in a first state (State 1), a trigger condition that would warrant a switch of $P_{CELL}$ antennas occurs. However, because certain $S_{CELL}$ criteria for performing the switch is not met (e.g., indicating the switch would adversely affect performance in the $S_{CELL}$), the switch is not executed. As illustrated in FIG. 16B, however, in a second state (State 2), when the P $S_{CELL}$ criteria for performing the switch is met while the $P_{CELL}$ trigger condition occurs, the switch is executed.

Such a switching algorithm (with a switch conditioned on $S_{CELL}$ criteria) may be applied, for example, in intra-band CA or inter-band CA (High Band/High Band or Low Band/Low band, e.g., bands B41+B38) scenarios where there are two RF ports and a single physical switch. In this case, switching for one carrier likely impacts the performance of other carrier(s). As noted above, a goal of this approach may be to define and execute a switch for one carrier if and only if performance of the other carriers is not adversely impacted, as determined by some independently defined metric (e.g., the change in RSRP or Tx power).

Examples of such scenarios may include when a switch trigger condition based on $P_{CELL}$ Rx/Tx conditions is met, but a switch trigger condition based on $S_{CELL}$ is not met. In this case, the switch may be executed only if on the SCC, the RSRP delta (DRx-PRx) is less than RSRPThresholdSCC, otherwise, the switch will not be allowed. In this manner, the RSRPThresholdSCC may be adjusted (fine-tuned) based on the overall performance of the system (e.g., by each UE OEM). Conversely, if no switch is triggered based on $P_{CELL}$ Rx/Tx power, but a switch is triggered based on SCC Rx/Tx conditions, it may be desirable to execute the switch if and only if the RSRP delta for the PCC is less than RSRPThresholdPCC (configurable through NV items). Again, this approach allows control over enabling/disabling ASDIV, not just based on either PCC or SCC performance, but overall system performance.

The techniques presented herein may provide a UE with an opportunity to use either $P_{CELL}$ or $S_{CELL}$ Rx/Tx conditions to trigger a switch, without relying solely on $P_{CELL}$ for ASDIV. While the techniques have been described with reference to relatively simple CA scenarios with two carriers (one PCC and one SCC), the techniques may be applied in more complicated CA scenarios (e.g., with more than one SCC), by extending the switching algorithm and switching mechanisms, accordingly.

For example, with reference to FIG. 12, to accommodate each additional SCC in Type I switching scenarios, an additional switch 910 (controlled by ASDIV control signals for that SCC) may be added. Similarly, with reference to FIGS. 13 and 14, to accommodate each additional SCC in Type II switching scenarios, an additional switch 1010 (controlled by ASDIV control signals for that SCC) may be added. With reference to FIGS. 16A and 16B, to accommodate each additional SCC in the Type I switching scenario involving a single physical antenna 1310, the physical antenna may be configured to accommodate antennas (e.g., Ant0 and Ant1) for each additional SCC and the switching algorithm may be updated to consider impact on the additional SCC as well.

The various operations of methods described above may be performed by any suitable combination of hardware and/or software component(s) and/or module(s).

It is understood that the specific order or hierarchy of steps in the processes disclosed is an example of exemplary approaches. Based upon design preferences, it is understood that the specific order or hierarchy of steps in the processes may be rearranged while remaining within the scope of the present disclosure. The accompanying method claims present elements of the various steps in a sample order, and are not meant to be limited to the specific order or hierarchy presented.

Those of skill in the art would understand that information and signals may be represented using any of a variety of different technologies and techniques. For example, data, instructions, commands, information, signals, bits, symbols and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

The previous description of the disclosed embodiments is provided to enable any person skilled in the art to make or use the present disclosure. Various modifications to these embodiments will be readily apparent to those skilled in the art, and the generic principles defined herein may be applied to other embodiments without departing from the spirit or scope of the disclosure. Thus, the present disclosure is not intended to be limited to the embodiments shown herein but is to be accorded the widest scope consistent with the principles and novel features disclosed herein.

What is claimed is:

1. A method for switching antennas in a user equipment capable of carrier aggregation, comprising:
   communicating via a primary component carrier using a first set of antennas;
   communicating via a secondary component carrier using a second set of antennas;
   obtaining first measurements indicative of a quality of signals received on the first set of antennas;
   obtaining second measurements indicative of a quality of signals received on the second set of antennas;
   controlling a first switching circuit used to route signals from at least one of the first set of antennas for receive diversity based on first criteria, wherein the first criteria are based on the first measurements, wherein the first switching circuit is used to route signals from the at least one of the first set of antennas to a first primary receiver and a first diversity receiver; and
   controlling a second switching circuit used to route signals from at least one of the second set of antennas for receive diversity based on second criteria, different from the first criteria, wherein the second criteria are based on the second measurements, wherein the second switching circuit is used to route signals from the at least one of the second set of antennas to a second primary receiver and a second diversity receiver.

2. The method of claim 1, wherein the first and second criteria are such that:
the first switching circuit is controlled to switch the at least one of the first set of antennas if one of the second measurements is maintained above a threshold after the switching of the at least one antenna of the first set of antennas.

3. The method of claim 1, wherein the first and second criteria are such that:
the second switching circuit is controlled to switch the at least one antenna of the second set of antennas if one of the first measurements is maintained above a threshold after the switching of the at least one antenna of the second set of antennas.

4. The method of claim 1, wherein the first and second measurements comprise reference signal received power (RSRP) measurements.

5. The method of claim 1, wherein the first and second measurements comprise transmit power measurements.

6. The method of claim 5, wherein the transmit power measurements are performed over a time period.

7. The method of claim 1, wherein at least one of the first or second criteria includes a comparison of a measured reference signal receive power (RSRP) measurement with a threshold value.

8. The method of claim 1, wherein at least one of the first or second criteria includes a comparison of a difference in reference signal receive power (RSRP), as measured on primary and diversity paths, with a threshold value.

9. The method of claim 1, wherein at least one of the first or second criteria are dependent on a previous or current state of the first and second switching circuits.

10. An apparatus for switching antennas in a user equipment capable of carrier aggregation, comprising:
at least one processor; and
a memory coupled with the at least one processor having instructions stored thereon, the instructions executable by the at least one processor for:
communicating via a primary component carrier using a first set of antennas;
communicating via a secondary component carrier using a second set of antennas;
obtaining first measurements indicative of a quality of signals received on the first set of antennas;
obtaining second measurements indicative of a quality of signals received on the second set of antennas;
controlling a first switching circuit used to route signals from at least one of the first set of antennas for receive diversity based on first criteria, wherein the first criteria are based on the first measurements, wherein the first switching circuit is used to route signals from the at least one of the first set of antennas to a first primary receiver and a first diversity receiver; and
controlling a second switching circuit used to route signals from at least one of the second set of antennas for receive diversity based on second criteria, different from the first criteria, wherein the second criteria are based on the second measurements, wherein the second switching circuit is used to route signals from the at least one of the second set of antennas to a second primary receiver and a second diversity receiver.

11. The apparatus of claim 10, wherein the first criteria are such that:
the first switching circuit is controlled to switch the at least one of the first set of antennas if one of the second measurements is maintained above a threshold after the switching of the at least one antenna of the first set of antennas.

12. The apparatus of claim 10, wherein the second criteria are such that:
the second switching circuit is controlled to switch the at least one antenna of the second set of antennas if one of the first measurements is maintained above a threshold after the switching of the at least one antenna of the second set of antennas.

13. The apparatus of claim 10, wherein the first and second measurements comprise reference signal received power (RSRP) measurements.

14. The apparatus of claim 10, wherein the first and second measurements comprise transmit power measurements.

15. The apparatus of claim 14, wherein the transmit power measurements are performed over a time period.

16. The apparatus of claim 10, wherein at least one of the first or second criteria includes a comparison of a measured reference signal receive power (RSRP) measurement with a threshold value.

17. The apparatus of claim 10, wherein at least one of the first or second criteria involves comparison of a difference in reference signal receive power (RSRP), as measured on primary and diversity paths, against a threshold value.

18. The apparatus of claim 10, wherein at least one of the first and second criteria are dependent on a previous or current state of the first and second switching circuits.

19. A non-transitory computer readable medium having instructions stored thereon for switching antennas in a user equipment capable of carrier aggregation, wherein the instructions cause the user equipment to:
communicate via a primary component carrier using a first set of antennas;
communicate via a secondary component carrier using a second set of antennas;
obtain first measurements indicative of a quality of signals received on the first set of antennas;
obtain second measurements indicative of a quality of signals received on the second set of antennas;
control a first switching circuit used to route signals from at least one of the first set of antennas for receive diversity based on first criteria, wherein the first criteria are based on the first measurements, wherein the first switching circuit is used to route signals from the at least one of the first set of antennas to a first primary receiver and a first diversity receiver; and
control a second switching circuit used to route signals from at least one of the second set of antennas for receive diversity based on second criteria, different from the first criteria, wherein the second criteria are based on the second measurements, wherein the second switching circuit is used to route signals from the at least one of the second set of antennas to a second primary receiver and a second diversity receiver.

20. The computer readable medium of claim 19, wherein the first criteria are such that:
the first switching circuit is controlled to switch the at least one of the first set of antennas if one of the second measurements is maintained above a threshold after the switching of the at least one antenna of the first set of antennas.

21. The computer readable medium of claim 19, wherein the second criteria are such that:

the second switching circuit is controlled to switch the at least one antenna of the second set of antennas if one of the first measurements is maintained above a threshold amount after the switching of the at least one antenna of the second set of antennas.

22. The computer readable medium of claim 19, wherein the first and second measurements comprise reference signal received power (RSRP) measurements.

23. The computer readable medium of claim 19, wherein the first and second measurements comprise transmit power measurements.

24. The computer readable medium of claim 23, wherein the transmit power measurements are performed over a time period.

25. The computer readable medium of claim 19, wherein at least one of the first or second criteria includes a comparison of a measured reference signal receive power (RSRP) measurement with a threshold value.

26. The computer readable medium of claim 19, wherein at least one of the first or second criteria includes a comparison of a difference in reference signal receive power (RSRP), as measured on primary and diversity paths, with a threshold value.

27. The computer readable medium of claim 19, wherein at least one of the first or second criteria are dependent on a previous or current state of the first and second switching circuits.

* * * * *